US009537695B2

United States Patent
Li

(10) Patent No.: US 9,537,695 B2
(45) Date of Patent: Jan. 3, 2017

(54) METHOD FOR MULTIPLEXING UPLINK CONTROL INFORMATION ON A PHYSICAL UPLINK SHARED CHANNEL

(71) Applicants: ZTE Corporation, Shenzhen (CN); ZTE (USA) Inc., Austin, TX (US)

(72) Inventor: Shupeng Li, Morristown, NJ (US)

(73) Assignees: ZTE Corporation, Shenzhen (CN); ZTE (USA) Inc., Austin, TX (US)

( * ) Notice: Subject to any disclaimer, the term of this patent is extended or adjusted under 35 U.S.C. 154(b) by 0 days.

(21) Appl. No.: 14/870,789

(22) Filed: Sep. 30, 2015

(65) Prior Publication Data
US 2016/0020935 A1    Jan. 21, 2016

Related U.S. Application Data

(62) Division of application No. 13/148,983, filed as application No. PCT/US2011/043278 on Jul. 8, 2011, now Pat. No. 9,178,736.

(60) Provisional application No. 61/373,587, filed on Aug. 13, 2010.

(51) Int. Cl.
G01R 31/08    (2006.01)
H04L 27/26    (2006.01)
H04L 1/00    (2006.01)
H04L 1/16    (2006.01)
H04L 5/00    (2006.01)
H04B 7/06    (2006.01)

(52) U.S. Cl.
CPC ......... *H04L 27/2602* (2013.01); *H04B 7/0632* (2013.01); *H04B 7/0634* (2013.01); *H04L 1/007* (2013.01); *H04L 1/0026* (2013.01); *H04L 1/0031* (2013.01); *H04L 1/0073* (2013.01); *H04L 1/1671* (2013.01); *H04L 5/0055* (2013.01); *H04L 5/0057* (2013.01)

(58) Field of Classification Search
CPC .................................................. H04W 72/0406
USPC ......... 370/232, 252–253, 328–339; 375/141, 375/267
See application file for complete search history.

(56) References Cited

U.S. PATENT DOCUMENTS

| 2003/0081692 | A1 | 5/2003 | Kwan et al. |
| 2009/0010208 | A1* | 1/2009 | Ishizaki ............... H04L 1/0007 370/328 |
| 2009/0147744 | A1 | 6/2009 | Dottling et al. |
| 2010/0002681 | A1 | 1/2010 | Rashid et al. |
| 2010/0080176 | A1 | 4/2010 | Maas et al. |
| 2010/0311421 | A1 | 12/2010 | Mach |

FOREIGN PATENT DOCUMENTS

EP    2487968 A1 *    8/2012    .......... H04W 52/346

OTHER PUBLICATIONS

International Search Report for EP 11177509 mailed Feb. 2012.
Sharp, "Codeword and Symbol Length Determination for UCI Multiplexing on the PUSCH with SU-MIMO," 3GPP TSG-RAN WG1#61bis; R1-103722 (2010).
Samsung, "Discussion on Data and Control Multiplexing in UL MIMO Transmissions," 3GPP TSG RAN WG1 #60bis; R1-102212; (2010).
ZTE, "UCE Multiplexing on PUSCH with MIMO Transmission", 3 GPP TSG-RAN WG1 Meeting #61 bis, R1-103601 (2010).
Nokia Siemens Networks, Nokia, "UCI Transmission on PUSCH with SU-MIMO", 3GPP TSG RAN WG1 Meeting #60 bis, R1-101905 (2010).
LTE, "3rd Generation Partnership Project; Technical Specification Group Radio Access Network; Evolved Universal Terrestrial Radio Access (E-UTRA); Multiplexing and Channel Coding) (Release 9)", V9.2.0, (2010).
Texas Instruments, "Remaining Issues on UCI Multiplexing for UL MIMO," 3GPP TSG RAN WG1 61bis, R1-103706, (2010).
Multiplexing and channel coding, 3GPP TS 36.212 V9.2.0, Jun. 2010.

\* cited by examiner

*Primary Examiner* — Iqbal Zaidi
(74) *Attorney, Agent, or Firm* — Drinker Biddle & Reath LLP

(57) ABSTRACT

A method of selecting resource element for UCI transmission and countering a ping-pong effect includes adjusting transmission parameters without adjusting a channel quality indicator/pre-coding matrix index. The transmission parameters include a modulation coding set of a transport block and a transport block size. Another method of selecting resource element for UCI transmission and countering the ping-pong effect includes selecting a transport block having a highest modulation coding set index or the transport block having a lowest modulation coding set index. Alternatively, the evolved Node B may select the transport block having a largest size or the transport block having the smallest size.

7 Claims, No Drawings

METHOD FOR MULTIPLEXING UPLINK CONTROL INFORMATION ON A PHYSICAL UPLINK SHARED CHANNEL

CROSS-REFERENCE TO RELATED APPLICATIONS

This application is a divisional application of application Ser. No. 13/148,983, filed May 21, 2012, which is incorporated by reference herein in its entirety. Application Ser. No. 13/148,983 is a national stage application (under 35 U.S.C. §371) of PCT/US2011/043278, filed Jul. 8, 2011, which claims benefit of U.S. Provisional Patent Application No. 61/373,587, filed Aug. 13, 2010, the disclosure of which is incorporated herein by reference in its entirety.

FIELD OF THE INVENTION

The field of the present invention is wireless communication and more specifically, uplink control information in a Long Term Evolution Advanced system.

BACKGROUND

The Third Generation Partnership Project ("3GPP") has specified Evolved Universal Terrestrial Radio Access ("E-UTRA") for support of wireless broadband data service. E-UTRA is also known as Long Term Evolution ("LTE") and is a standard in mobile network technology. 3GPP uses a system of parallel releases to provide a stable platform for implementation and allows for the addition of new features.

Long Term Evolution Advanced ("LTE-A") started in 3GPP. The Technical Specification Group—Radio Access Network Working Group 1 ("TSG-RAN WG1") is responsible, in part, for the specification of the physical layer of a radio interface for user equipment ("UE"), a Universal Terrestrial Radio Access Network ("UTRAN"), and an Evolved UTRAN; covering both frequency division duplexing ("FDD") and time division duplexing ("TDD") modes of radio interfaces.

The TSG-RAN WG1 addressed multiplexing uplink control information ("UCI") on a Physical Uplink Shared Channel ("PUSCH") in the case of a Single User-Multiple Input Multiple Output ("SU-MIMO") system. The TSG-RAN WG1 also described formulas for calculating a rank indicator ("RI"), a Channel Quality Indicator/Pre-coding Matrix Index ("CQI/PMI"), and resources per layer of acknowledgement/negative acknowledgement ("ACK/NACK") code.

However, there are certain unique scenarios for which the TSG-RAN WG1 has not described formulas for calculating the RI, the CQI/PMI, and resources per layer of ACK/NACK code. Furthermore, the ping-pong effect and settlement on multi-beta values also remain to be properly addressed. Accordingly, there is a need for improved methods for countering the ping-pong effect; selecting a code word to transmit the CQI/PMI; multiplexing UCI and data per code word; and addressing certain scenarios for determining ACK/NACK code and a RI.

SUMMARY OF THE INVENTION

The present invention is directed toward methods of multiplexing uplink control information on a physical uplink shared channel.

In a first separate aspect of the present invention, in order to counter a ping-pong effect, an evolved Node B adjusts a modulation coding set or a transport block size of a transport block without adjusting a channel quality indicator/pre-coding matrix index.

In a second separate aspect of the present invention, in order to counter a ping-pong effect, an evolved Node B selects a transport block for channel quality indicator/pre-coding matrix index transmission. The evolved Node B may select the transport block having a highest modulation coding set index or the transport block having a lowest modulation coding set index. Alternatively, the evolved Node B may select the transport block having a largest size or the transport block having the smallest size.

In a third separate aspect of the present invention, a code word is selected to transmit a channel quality indicator/pre-coding matrix index having user equipment in a single user-multiple input multiple output mode. A first code word is disabled on a control channel. The user equipment then selects a transport block to transmit the channel quality indicator/pre-coding matrix index.

In a fourth separate aspect of the present invention, virtual unit sequences of a channel quality indicator/pre-coding matrix index and data are multiplexed on a physical downlink control channel. The virtual unit sequences are then interleaved with acknowledgement/negative acknowledgement code, a rank indicator, and new data.

Additional aspects and advantages of the improvements will appear from the description of the preferred embodiment.

DETAILED DESCRIPTION OF THE PREFERRED EMBODIMENTS

Unless otherwise indicated below, the ensuing description is based upon the following assumptions. First, a transport block associated with a highest modulation coding set index or largest transport block size is indicated by an uplink grant. This assumption, however, can be revisited if major performance loss is identified when compared to other approaches. Also, the first of two transport blocks is preferred when the modulation coding set ("MCS") or the transport block size is the same for both transport blocks. Finally, a CQI/PMI is transmitted on the transport block that is associated with the highest MCS index or largest transport block size. This transport block may be indicated by the uplink grant for a two transport block transmission.

Addressing the Ping-Pong Effect

The ping-pong effect is a situation in which an introduction of UCI reverses an order of the MCS between two transport blocks. This effect may occur when an evolved Node B ("eNB") adjusts the MCS of one of the transport blocks with UCI.

During an initial PUSCH transmission, the ping pong effect generally does not occur when CQI/PMI overhead is particularly large or small, regardless of whether the eNB takes the CQI/PMI overhead into account in link adaptation. When the CQI/PMI overhead is large, however, the eNB may configure a larger PUSCH offset parameter ("$\beta_{offset}^{PUSCH}$") to ensure the quality of the CQI/PMI. When the MCSs or transport block sizes of two transport blocks are relatively close, the ping pong effect may occur.

The ping-pong effect can be solved using several methods. In a first method, a baseline is not changed, and therefore does not need to be specified. For example, an eNB can adjust the MCS or transport block size of a particular transport block without adjusting a CQI/PMI. This method, however, may impact a data block error ratio (BLER).

In a second method, the ping-pong effect may be solved by standardized methods that reduce the impact on data. Under one such standardized method, when certain conditions are satisfied, (e.g. when the MCS index of one of the transport blocks remains the highest after multiplexing with UCI) the transport block with the highest MCS or largest transport block size is chosen for CQI/PMI transmission. Otherwise, the transport block with the lowest MCS index or smallest transport block size is chosen for CQI/PMI transmission. This method, however, is fairly complex.

In another standardized method, a transport block chosen for CQI/PMI transmission may be indicated through an uplink grant. For example, a 1 bit transport block to code word swap, a 1 bit hopping flag, or other indicator may be used. These bits may be used to indicate the transport block chosen for CQI/PMI transmission or to indicate a chosen scheme when the ping pong effect occurs. For example, by default, the CQI will be transmitted via the code word associated with a higher MCS index, but if the transport block to code word swap bit is set, then it is transmitted via the code word associated with a lower MCS index.

The ping-pong effect generally does not occur during PUSCH retransmission because an eNB does not need to consider the CQI/PMI overhead of an initial transmission of the same PUSCH. The effect is also nonexistent because the transport block size of a transport block for retransmission is the same as for the initial transmission.

Selecting a Code Word for CQI/PMI Transmission

In a first scenario, user equipment is in a SU-MIMO mode with little data to be transmitted. If one code word is disabled by a physical downlink control channel ("PDCCH"), a CQI/PMI can be multiplexed on an enabled code word's corresponding transport block. Otherwise, if one code word is enabled for UCI transmission only, the CQI/PMI should be transmitted on the enabled code word's corresponding transport block and data should be transmitted on another code word's corresponding transport block.

Similar to the first scenario above, in a second scenario, user equipment is in a SU-MIMO mode. However, in this second scenario, no data is to be transmitted. If one code word is disabled by a PDCCH, a CQI/PMI can be transmitted on an enabled code word's corresponding transport block. Otherwise, the user equipment can select a first transport block to transmit the CQI/PMI.

In a third scenario, a MCS or transport block size is the same for both transport blocks. In this case, user equipment can, like in the second scenario above, select a first transport block to transmit a CQI/PMI.

Multiplexing for UCI and Data per Code Word

UCI and data of different layers belong to a particular transport block that constitutes sequences of a virtual unit. These virtual unit sequences are multiplexed according to a method described in 3GPP Release 8 (Rel-8). An output of these multiplexed virtual unit sequences is a virtual unit sequence of new data. If the particular transport block is not selected for a CQI/PMI, the virtual unit sequence of new data is the same as the virtual unit sequence of data prior to being multiplexed.

A virtual unit sequence of ACK/NACK code, an RI, and/or new data is interleaved according to a method described in Rel-8. The size of the interleaver is C*R, where C represents a sub-carrier number for use and R represents the single carrier-frequency-division multiple access (SC-FDMA). The output of the interleaver is a virtual unit sequence with length C*R, read column-by-column.

With this method, the processing of data and control multiplexing and channel interleaving can be reused in accordance with Rel-8. However, this method needs to constitute a virtual unit sequence which can be processed through channel coding. For example, in Rel-8, a vector sequence output of channel coding for RI is denoted by $q_0^{RI}$, $q_1^{RI}, \ldots, q_{Q'RI-1}^{RI}$, where $Q'_{RI}=Q_{RI}/Q_m$ and $\underline{q}_k^{RI}=[q_i^{RI} \ldots q_{i+Q_m-1}^{RI}]^T$. In 3GPP Release 10 (Rel-10), the virtual unit sequence output of channel coding for rank information is $\underline{q}_k^{RI}=[\underline{q}_k^{RI_{layer0}} \underline{q}_k^{RI_{layer\,1}}]=[q_i^{RI_{layer0}} \ldots q_{i+Q_m-1}^{RI_{layer\,1}} q_i^{RI_{layer1}} \ldots q_{i+Q_m-1}^{RI_{layer1}}]^T$.

Calculating Resources per Layer of ACK/NACK and RI

In a first scenario, $$\sum_{i=0}^{C_r^{(i)}-1} K_r^{(i)},$$

which calculates resources per layer of ACK/NACK and RI, in the equation $$Q' = \min\left\{ \left\lceil \frac{O \cdot M_{sc}^{PUSCH\text{-}initial} \cdot N_{symb}^{PUSCH\text{-}initial} \cdot \beta_{offset}^{PUSCH}}{\sum_{n=1}^{N_{TB}} \sum_{r=0}^{C^{(n)}-1} K_r^{(n)}} \right\rceil, 4 \cdot M_{sc}^{PUSCH} \right\},$$

$$\beta_{offset}^{PUSCH} = \begin{cases} \beta_{offset\_one\_CW}^{ACK} & N_{TB} = 1 \\ \beta_{offset\_n\_CW}^{ACK} & N_{TB} > 1 \end{cases}$$

can instead be $O_{CQI\text{-}min}$, where a transport block is only for CQI/PMI transmission.

In the above equations, O is the number of ACK/NACKs, RIs, or CQI bits; $M_{sc}^{PUSCH\text{-}initial}$ is an initially scheduled bandwidth for the same transport block expressed as number of subcarriers; $M_{sc}^{PUSCH}$ is the scheduled bandwidth for the current PUSCH in the unit of subcarriers; C is the number of code blocks for the transport block; $K_r$ is the number of bits for code block number r; $\beta_{offset}^{PUSCH}$ is the offsets configured by higher layers; $N_{symb}^{PUSCH\text{-}initial}$ is the number of single carrier-frequency division multiplexing (SC-FDM) symbols in a subframe for initial PUSCH transmission; $N_{symb}^{PUSCH}$ is the number of SC-FDM symbols in the current PUSCH transmission subframe; L is the number of cyclic redundancy check ("CRC") bits (L=8 for CQI); $\beta_{offset\_one\_CW}^{ACK}$ is the offset value for single layer transmission configured by higher layer; $\beta_{offset\_n\_CW}^{ACK}$ is the offset value for multiple layer transmission configured by higher layer; and $N_{TB}$ is the number corresponding to a particular transport block.

In a second scenario, formulas to calculate resources per layer of ACK/NACK and RI are the same as for calculating the resources of ACK/NACK and RI without data in Rel-8.

While embodiments of this invention have been shown and described, it will be apparent to those skilled in the art that many more modifications are possible without departing from the inventive concepts herein. The invention, therefore, is not to be restricted except in the spirit of the following claims.

What is claimed is:

1. A method of selecting a code word to transmit a channel quality indicator/pre-coding matrix index (CQI/PMI) in a wireless system having user equipment in a single user-multiple input multiple output mode, the method comprising:

selecting, by the user equipment, a transport block from among a plurality of transfer blocks, wherein:
the transport block is configured to transmit the channel quality indicator/pre-coding matrix index using virtual unit sequences that can be processed through channel coding, including;
in the case a first code word is disabled by a physical downlink control channel, multiplexing the CQI/UPMI on a second code word's corresponding transport block; and
in the case the first code word is enabled only for uplink control information (UCI) transmission, transmitting the CQI/PMI on the second code word's corresponding transport block, and transmitting data on a third code word's corresponding transport block.

2. The method of claim 1, wherein the plurality of transfer blocks have the same modulation coding set.

3. The method of claim 1, wherein the plurality of transfer blocks have the same transport size.

4. A system of selecting a code word to transmit a channel quality indicator/pre-coding matrix index (CQI/PMI) in a wireless system having user equipment in a single user-multiple input multiple output mode, the system comprising:
a circuit for selecting, by the user equipment, a transport block of at least two transfer blocks, wherein:
the transport block is configured to transmit the channel quality indicator/pre-coding matrix index using virtual unit sequences that can be processed through channel coding, including:
in the case a first code word is disabled by a physical downlink control channel, multiplexing the CQI/PMI on a second code word's corresponding transport block; and
in the case the first code word is enabled only for uplink control information (UCI) transmission, transmitting the CQI/PMI on the second code word's corresponding transport block, and transmitting data on a third code word's corresponding transport block.

5. The system of claim 4, wherein the at least two transfer blocks have the same modulation coding set.

6. The system of claim 4, wherein the at least two transfer blocks have the same transport size.

7. A method of combining uplink control information and data of different layers belonging to one transport block, the method comprising:
multiplexing, on a physical downlink control channel, sequences of uplink control information and data of different layers, as a virtual unit sequence of new data; and
interleaving the virtual unit sequence of new data with sequences of at least one of an acknowledgement/negative acknowledgement code, a rank indicator, and new data, as a virtual unit sequence with length C*R read column-by-column, where C represents a number of sub-carriers used and R represents a single-carrier frequency division multiple access (SC-FDMA).

* * * * *